United States Patent
Myung

(10) Patent No.: US 9,049,362 B2
(45) Date of Patent: Jun. 2, 2015

(54) PHOTOGRAPHING APPARATUS AND METHOD OF PROVIDING PHOTOGRAPHED VIDEO

(75) Inventor: Jin-su Myung, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 673 days.

(21) Appl. No.: 12/909,904

(22) Filed: Oct. 22, 2010

(65) Prior Publication Data

US 2011/0115935 A1    May 19, 2011

(30) Foreign Application Priority Data

Nov. 13, 2009 (KR) .......................... 10-2009-109686

(51) Int. Cl.
*H04N 5/228* (2006.01)
*H04N 5/232* (2006.01)
*H04N 7/12* (2006.01)

(52) U.S. Cl.
CPC . *H04N 5/232* (2013.01); *H04N 7/12* (2013.01)

(58) Field of Classification Search
CPC ...... H04N 7/12; H04N 5/232; H04N 5/23229
USPC .......... 348/14.01, 14.02, 14.11, 14.12, 211.1, 348/211.2, 211.93, 211.99, 222.1, 231.4, 348/231.9
See application file for complete search history.

(56) References Cited

U.S. PATENT DOCUMENTS

| | | | | |
|---|---|---|---|---|
| 6,249,324 B1* | 6/2001 | Sato et al. | ..................... | 348/705 |
| 7,672,569 B2* | 3/2010 | Horiuchi et al. | .............. | 386/223 |
| 8,300,107 B2* | 10/2012 | Strandwitz et al. | ...... | 348/211.99 |
| 2004/0223058 A1* | 11/2004 | Richter et al. | ............. | 348/207.1 |
| 2005/0155071 A1* | 7/2005 | Notoya et al. | ................... | 725/88 |
| 2009/0157750 A1* | 6/2009 | Kim et al. | .................. | 707/104.1 |
| 2010/0111489 A1* | 5/2010 | Presler | ........................... | 386/52 |
| 2012/0002000 A1* | 1/2012 | Guerrero | ................... | 348/14.02 |

FOREIGN PATENT DOCUMENTS

| | | |
|---|---|---|
| KR | 100490948 | 5/2005 |
| KR | 20070074804 | 7/2007 |

* cited by examiner

*Primary Examiner* — Lin Ye
*Assistant Examiner* — Chriss Yoder, III
(74) *Attorney, Agent, or Firm* — Staas & Halsey LLP

(57) ABSTRACT

A photographing apparatus and a method of providing a photographed video converts a photographed video into two types of formats, stores the converted video, and transmits the video wirelessly in real-time. Therefore, a user stores a high quality video photographed by a photographing apparatus as well as broadcasts the photographed video in real-time.

31 Claims, 11 Drawing Sheets

FIG. 8B

Common Data Structure

|  | FF | FF | FF |  |
|---|---|---|---|---|
| Message_T | Data_Type | | | |
| UInt | Data_len | | | |
| UInt | nTimeStamp | | | |
| BYPE * | pBuffer | | | |

US 9,049,362 B2

PHOTOGRAPHING APPARATUS AND METHOD OF PROVIDING PHOTOGRAPHED VIDEO

CROSS-REFERENCE TO RELATED APPLICATIONS

This application claims priority under 35 U.S.C. §119(a) from Korean Patent Application No. 2009-109686, filed on Nov. 13, 2009, in the Korean Intellectual Property Office, the contents of which are incorporated herein by reference in its entirety.

BACKGROUND

1. Field of the General Inventive Concept

The present general inventive concept relates to a photographing apparatus and a method of providing a photographed video, and more particularly, to a photographing apparatus to photograph or record high quality videos and a method of providing a photographed video.

2. Description of the Related Art

With the development of technologies related to a photographing apparatus, the quality of videos which are photographed by photographing apparatuses has greatly improved. Recently developed photographing apparatuses can photograph video in full high definition (HD) resolution.

When a photographing apparatus photographs a video in high resolution, the photographing apparatus obtains a high quality image, which is an advantage. However, the higher the resolution of an image, the larger the size of the photographed video data that represents the image will be, and the photographing apparatus may require a large capacity storage medium to store the high resolution video data.

In addition, the large capacity of the high resolution video may be a problem when providing a broadcasting service in real-time. This is because the photographed video has to be transmitted in real-time for a real-time broadcasting service, but a communications network cannot guarantee a communication speed to transmit a full HD image in real-time.

As described above, it is difficult for the photographing apparatus to photograph a video in high resolution and to transmit the photographed video in real-time. Therefore, there is a need for a method to broadcast a high resolution video photographed by a photographing apparatus in real-time.

SUMMARY

The present general inventive concept provides a photographing apparatus to convert a photographed or recorded video into two types of formats, to store the converted videos, and to transmit the videos wirelessly in real-time, and a method of providing a photographed video.

Additional features and utilities of the present general inventive concept will be set forth in part in the description which follows and, in part, will be obvious from the description, or may be learned by practice of the general inventive concept.

Embodiments of the present general inventive concept may be achieved by providing a photographing apparatus, including an image sensor to photograph an object and to output first video data, a scaler to adjust the size of the first video data, and to output second video data, a video encoder to encode the first video data and the second video data, and to output a first video stream and a second video stream, a first multiplexer (MUX) to multiplex the first video stream and an audio stream, and to convert the multiplexed stream into a video file of a first format, a second multiplexer (MUX) to multiplex one of the first video stream and the second video stream and the audio stream, and to convert the multiplexed stream into a video file of a second format, and a communication unit to transmit the video file of the second format wirelessly.

The photographing apparatus may further include a selection unit to select one of the first video stream and the second video stream according to a manipulation of a user, and to output the selected video stream.

The photographing apparatus may further include a storage unit to store at least one of the video file of the first format and the video file of the second format.

The first MUX may output the video file of the first format to the storage unit, the second MUX may multiplex the second video stream with the audio stream, convert the multiplexed stream into a video file of the second format, and output the video file of the second format to the communication unit, and the communication unit may transmit the video file of the second format wirelessly to the outside.

The video file of the first format may be a video file having the same definition as the first video data photographed by the image sensor.

The video file of the first format may be a video file having full high definition (HD).

The video file of the second format may be a video file having capacity which is the same as or less than the capacity capable of being transmitted by the communication unit wirelessly.

The photographing apparatus may further include a control unit to control the second MUX to perform at least one of storing the video file of the second format in the storage unit and transmitting the video file of the second format wirelessly through the communication unit according to a manipulation of a user.

The scaler may adjust the size of the first video data by performing at least one of adjusting resolution of the first video data and extracting a specific portion from the first video data.

Embodiments of the present general inventive concept may also be achieved by providing a method of providing a photographed video, including photographing an object and generating first video data, adjusting the size of the first video data, and generating the second video data, encoding the first video data and the second video data to be converted into a first video stream and a second video stream, multiplexing the first video stream and an audio stream, and converting the multiplexed stream into a video file of a first format, multiplexing one of the first video stream and the second video stream and the audio stream, and converting the multiplexed stream into a video file of a second format, and transmitting the video file of the second format wirelessly.

The converting the multiplexed stream into a video file of a second format may select one of the first video stream and the second video stream according to a manipulation of a user, multiplex the selected video stream and the audio stream, and convert the multiplexed stream into a video file of a second format.

The method may further include storing at least one of the video file of the first format and the video file of the second format.

The storing may store the video file of the first format, the converting the multiplexed stream into the video file of the second format may multiplex the second video stream with the audio stream, and convert the multiplexed stream into a video file of the second format, and the transmitting may transmit the video file of the second format wirelessly to an outside.

The video file of the first format may be a video file having the same definition as that of the first video data photographed by an image sensor.

The video file of the first format may be a video file having full high definition (HD).

The video file of the second format may be a video file having capacity which is the same as or less than the capacity capable of being transmitted by the communication unit wirelessly.

The method may further include controlling to perform at least one of storing the video file of the second format and transmitting the video file of the second format wirelessly according to a manipulation of a user.

The generating the second video data may adjust the size of the first video data by performing at least one of adjusting resolution of the first video data and extracting a specific portion from the first video data, and generate the second video data.

Embodiments of the present general inventive concept may also be achieved by providing a photographing apparatus including an image sensor unit to capture moving images, convert the moving images into an electrical signal and output the electrical signal as video data, a scaler unit to reduce the size of the video data, and a communication unit to wirelessly transmit the reduced size video data in real time.

A video encoder unit may receive the video data and the reduced size video data and create a plurality of video streams to correspond to the video data and reduced size video data, and a multiplexer unit may convert one of the plurality of video streams into a video file to be transmitted by the communication unit.

A selection unit may select one of the plurality of video streams to be converted by the multiplexer, and a control unit may control the output of the selection unit according to a pre-programmed option or a manipulation of a user.

The video file may include a moov box and an mdat box.

The video encoder unit may further include an encoder, a first buffer to temporarily store the video data output from the image sensor, and a second buffer to temporarily store the reduced video data output from the scaler unit, wherein the first and second buffers may alternately input the video data and reduced video data to the encoder.

Embodiments of the present general inventive concept may also be achieved by providing a method of providing a photographed video including converting moving images into an electrical signal and outputting the electrical signal as video data, reducing the size of the video data, and wirelessly transmitting the reduced size video data in real time.

The method may further include receiving the reduced size video data in an encoder unit and encoding the reduced size video data into a video stream.

The method may further include temporarily storing the video data in a first buffer of the encoder unit, and temporarily storing the reduced video data in a second buffer of the encoder unit, wherein the first and second buffers alternately input the video data and reduced video data to an encoder within the encoder unit.

The method may further include multiplexing the video stream and an audio stream and converting the multiplexed stream into a video file including a track having data and timing information to correspond to different portions of the video file.

Embodiments of the present general inventive concept may also be achieved by a method of providing a photographed video, the method including converting a photographed video into video data having two types of video data formats, temporarily storing the converted video data, and transmitting the video data wirelessly in real time.

The transmitted video data may be reduced size video data.

The reduced size video data may be reduced by reducing the resolution of the video data or selecting a portion of the video data.

The method may further include receiving the video data and reduced size video data in an encoder and parallel encoding the video data and the reduced size video data into a plurality of video streams to be transmitted wirelessly in real time.

BRIEF DESCRIPTION OF THE DRAWINGS

These and/or other features and utilities of the present general inventive concept will become apparent and more readily appreciated from the following description of the embodiments, taken in conjunction with the accompanying drawings of which

FIGS. 8A to 8C are views illustrating the structure of a video file to be broadcast in real-time according to an exemplary embodiment of the present general inventive concept.

DETAILED DESCRIPTION OF THE EMBODIMENTS

Figure 1:
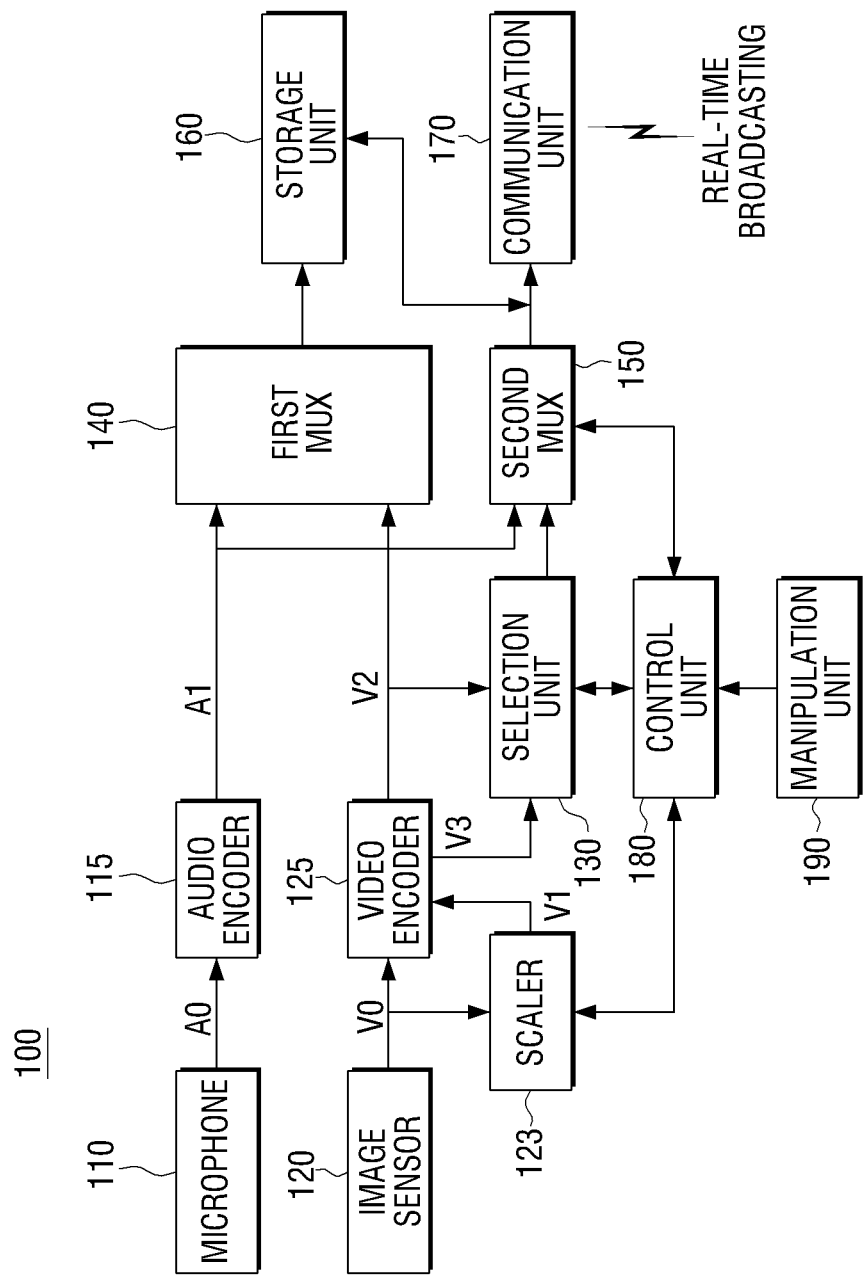
FIG. 1 is a block diagram illustrating a photographing apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

In the present general inventive concept described herein, the terms "photograph" and "photographing" may be used interchangeably with terms such as "record" and "recording" to mean that not simply that a still image may be photographed, but that a moving video may be photographed to record or film short, long or continuous streaming segments of moving video images. Thus, when the specification describes photographing an object, a video, or moving images, these terms also mean that a video, not simply a still image photograph, may be recorded, stored, and/or transmitted in the various embodiments described herein. When discussing a "photographing apparatus" in the present general inventive concept, the term is meant to include an apparatus that may take traditional digital photographs and also include a video camera and related apparatuses that may capture moving video images.

FIG. 1 is a block diagram illustrating a photographing apparatus 100 according to an exemplary embodiment of the present general inventive concept. Referring to FIG. 1, the photographing apparatus 100 may include a microphone 110, an audio encoder 115, an image sensor 120, a scaler 123, a video encoder 125, a selection unit 130, a first multiplexer (MUX) 140, a second multiplexer (MUX) 150, a storage unit 160, a communication unit 170, a control unit 180, and a manipulation unit 190.

The microphone 110 may receive voice and other audio sounds, convert the voice or other sounds into audio data (A0), and output the audio data (A0) to the audio encoder 115. That is, the microphone 110 may convert an acoustic signal into the audio data (A0), which is an electrical signal.

The audio encoder 115 compresses the input audio data (A0), and may generate a compressed audio stream (A1). The audio encoder 115 may compress audio data using encoding techniques such as advanced audio coding (AAC), audio coding (AC3), and so on.

The image sensor 120 photographs an object, and outputs first video data (V0) corresponding to the photographed video. That is, the image sensor 120 converts incoming light into the first video data (V0) which can be an electrical signal. The image sensor 120 may be implemented using a charge coupled device (CCD) or a complementary metal oxide semiconductor (CMOS).

The scaler 123 may adjust the size of the first video data (V0), generate second video data (V1) having a different or smaller size than the first video data (V0) and output the second video data (V1). The scaler 123 may adjust the size of the first video data (V0) by performing at least one of adjusting the resolution of the first video data (V0) and extracting one or a plurality of specific portions from the video data (V0) to produce the second video data (V1).

Specifically, the scaler 123 may generate the second video data (V1) of which an image or file size is smaller than that of the first video data (V0) by adjusting the resolution of the first video data (V0) from a high resolution to a lower resolution. For instance, the scaler 123 may generate the second video data (V1) by adjusting the resolution of the first video data (V0) from full high definition (HD) to standard definition (SD).

In addition, the scaler 123 may generate the second video data (V1) of which the file size is smaller than that of the first video data (V0) by extracting at least one portion from the first video data (V0). For example, the scaler 123 may extract a portion selected by a user from the first video data (V0), and generate the second video data (V1) using the extracted portion. Also, the extracted portion may be a pre-programmed portion to capture a desired section of the video being recorded.

Therefore, the scaler 123 may adjust the resolution of the first video data (V0) or extract a specific portion from the first video data (V0) according to a pre-programmed selection or a selection of a user to generate or output the second video data (V1) of which the size is adjusted.

The scaler 123 may generate the second video data (V1) by reducing the size of the first video data (V0) so that the communication unit 170 may transmit the second video data (V1) wirelessly or by wired connection in real-time. As the first video data (V0) which is an original video photographed by the photographing apparatus 100 may be a high quality video, there is a possibility that it may be difficult or impossible to transmit the first video data (V0) over limited bandwidth of the communication unit 170 or accessible by the communication unit 170. Therefore, the scaler 123 may reduce the size of the first video data (V0), which is the original video data representing the original captured or recorded video, to generate the second video data (V1), thereby enabling the photographing apparatus 100 to broadcast the photographed video over bandwidth of or accessible by the communication unit 170.

The video encoder 125 may encode the first video data (V0) and the second video data (V1), and output a first video stream (V2) and a second video stream (V3), respectively. Specifically, the video encoder 125 may encode the first video data (V0) and the second video data (V1) in parallel to provide greater output options for the photographing apparatus 100. For the parallel processing, the video encoder 125 may be implemented using buffers such as RAM memory to temporarily store the video data and video streams. The structure of the video encoder 125 will be explained in detail with reference to FIG. 2.

Figure 2:
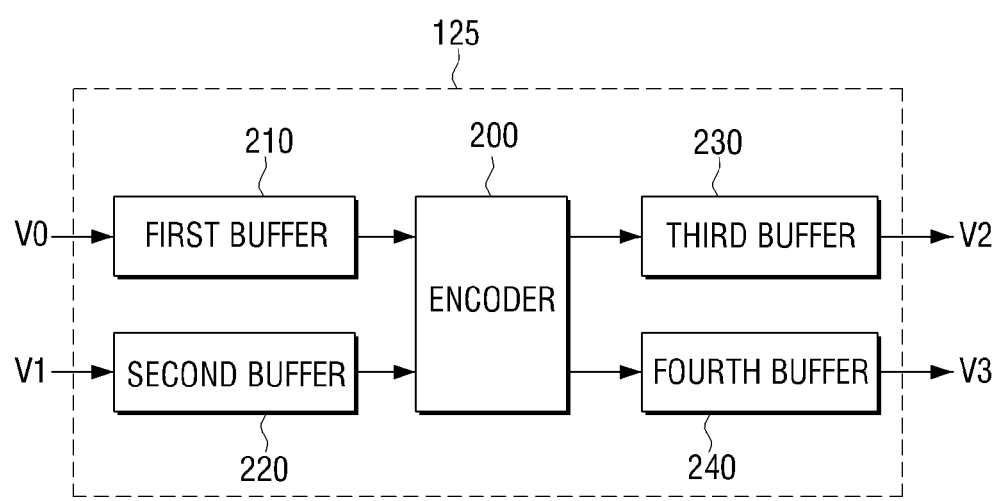
FIG. 2 is a block diagram illustrating a video encoder according to an exemplary embodiment of the present general inventive concept.

FIG. 2 is a block diagram illustrating the video encoder 125 according to an exemplary embodiment of the present general inventive concept. Referring to FIG. 2, the video encoder 125 may include an encoder 200, a first buffer 210, a second buffer 220, a third buffer 230, and a fourth buffer 240.

The first buffer 210 may temporarily store the first video data (V0) output from the image sensor 120, and the second buffer 220 may temporarily store the second video data (V1) output from the scaler 123. The first and second buffers 210 and 220 may alternately input the first and second video data (V0) and (V1) to the encoder 200 by a predetermined unit, for example, a frame unit.

The encoder 200 may encode the video data temporarily stored in the first and second buffers 210 and 220, and temporarily store the encoded video data in the third and fourth buffers 230 and 240. Specifically, the encoder 200 may encode the first video data (V0) input into the first buffer 210, and temporarily store the encoded first video stream (V2) in the third buffer 230. The encoder 200 may encode the second video data (V1) input into the second buffer 220, and temporarily store the encoded second video stream (V3) in the fourth buffer 240.

As illustrated in FIGS. 1 and 2, the third buffer 230 of the video encoder 125 may output the first video stream (V2) to the first MUX 140 and to the selection unit 130. The fourth buffer 240 of the video encoder 125 may output the second video stream (V3) to the selection unit 130.

Referring again to FIG. 1, the selection unit 130 selects one of the first video stream (V2) and the second video stream (V3) according to a pre-programmed selection or manipulation of a user, and outputs the selected video stream (V2) or (V3) to the second MUX 150. The selection unit 130 may be controlled by the control unit 180, and may be implemented as a switch unit to switch one of the first video stream (V2) and the second video stream (V3) and to output the video stream (V2) or (V3) to the second MUX 150.

If the bandwidth of the communication unit 170 or accessible by the communication unit 170 is enough to transmit the first video stream (V2) wirelessly in real-time, a user may manipulate the selection unit 130 to select the first video stream (V2). The controller 180 may also be programmed to automatically make this determination, and transmit the video stream (V2). Usually, as the first video stream (V2) is in high quality and may require a large bandwidth for transmission, it may be difficult or impossible to transmit the first video stream (V2) wirelessly in real-time. When these difficulties arise, the control unit 180 may control the selection unit 130 to select the second video stream (V3) of which the size has been scaled to be smaller.

Figure 7A:
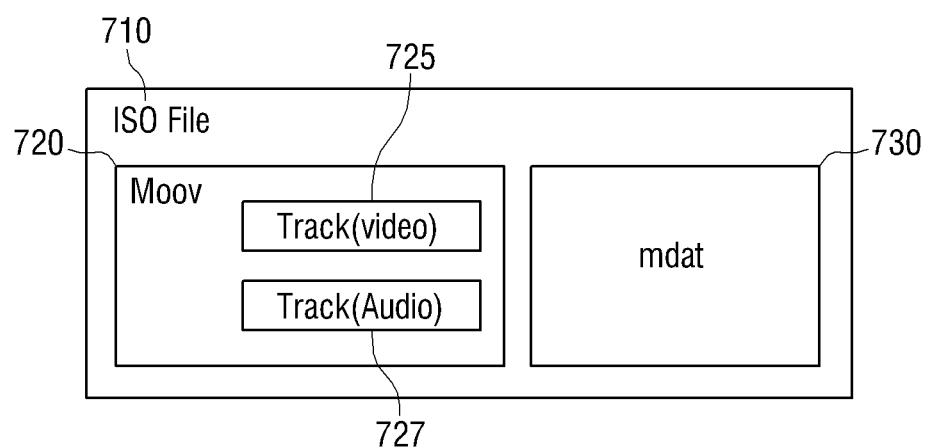
FIGS. 7A and 7B are views illustrating the structure of a video file of MPEG layer 4 (MP4) format according to an exemplary embodiment of the present general inventive concept.
Figure 7B:
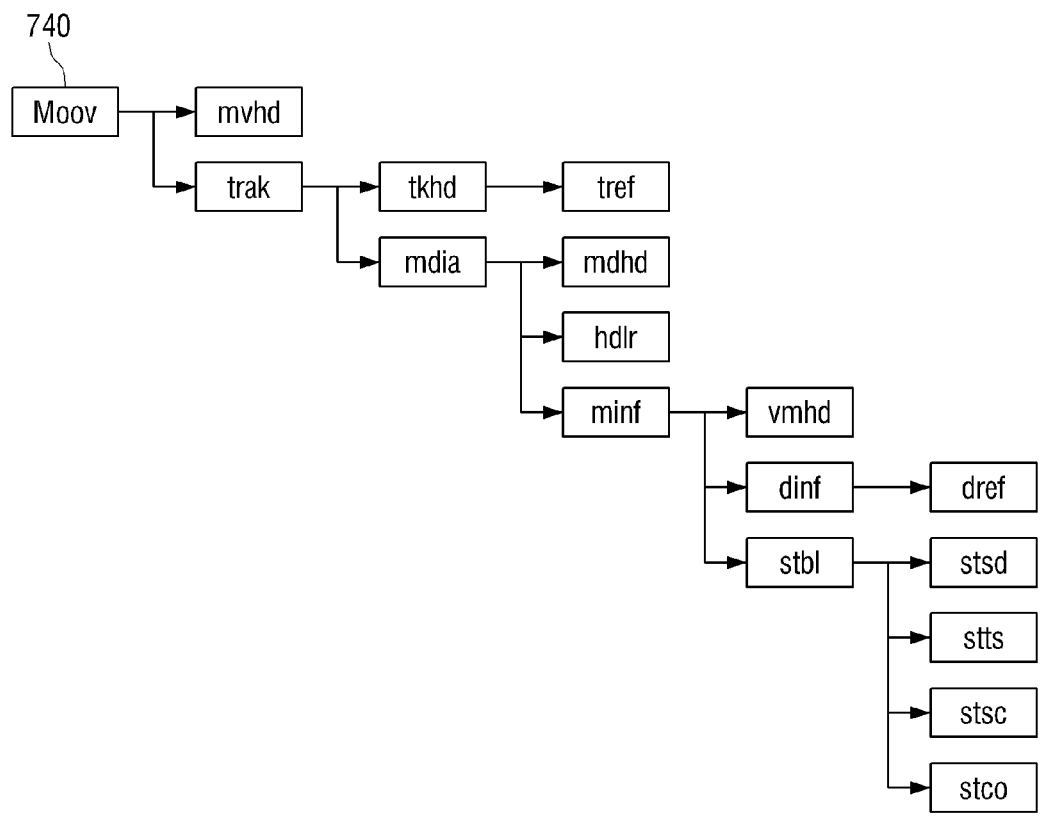

The first MUX 140 may multiplex the first video stream (V2) and the audio stream (A1), and convert the multiplexed stream into a video file of a first format. The first MUX 140 outputs the video file of the first format and stores the video file in the storage unit 160. Herein, the first format may represent a format suitable to store a video file. Since the video file of the first format is an original photographed video, the first MUX 140 converts the first video stream (V2) into the first format suitable to store a file. For example, the first format may be a format such as MP4, audio video interleave (AVI), and so on. The structure of the file of the MP4 format is illustrated in FIGS. 7A and 7B, and will be explained later.

The video file of the first format may be a video file having the same resolution as that of the first video data photographed by the image sensor 120. For example, the video file of the first format may be a video file having full HD quality.

Figure 8A:
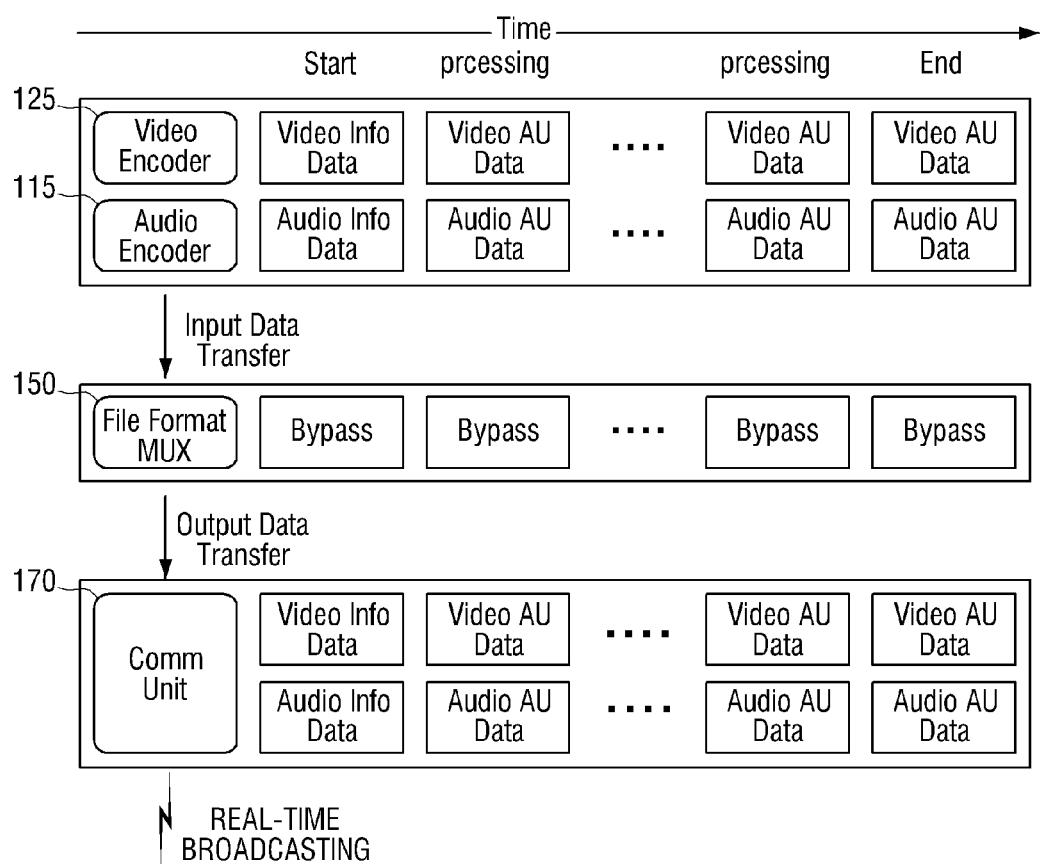
Figure 8C:
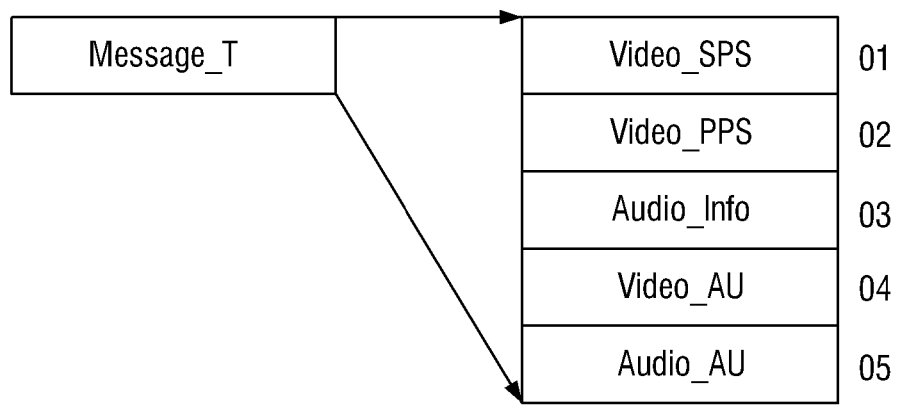

The second MUX 150 may multiplex the audio stream (A1) and the video stream (V2) or (V3) selected by the selection unit 130, and converts the multiplexed stream into a video file of the second format. Since the video file of the second format may be transmitted wirelessly in real-time, the second MUX 150 may convert the video stream input by the selection unit 130 into the second format which is suitable to transmit a file wirelessly in real-time. The second format is suitable for wireless transmission in real-time. The file structure of a file format suitable for wireless transmission in real-time is illustrated in FIGS. 8A to 8C, and thus this will be explained later. The video format illustrated in FIGS. 7A and 7B may also be used for wireless transmission of the video files as described herein. As described above, since the video file of the second format is for wireless transmission, its capacity may be the same as or less than the capacity that can be transmitted wirelessly by the communication unit 170 in real-time.

The storage unit 160 may store programs to execute various operations of the photographing apparatus 100. The storage unit 160 may also store the video file of the first format and the video file of the second format. The storage unit 160 may be implemented using a hard disc drive, a non-volatile memory, an external memory such as a flash drive, and other storage mediums as are known in the art.

The communication unit 170 may be connected to an intranet network, an internet network or an external device for communication. The communication unit 170 may transmit a video file of the second format in a wireless manner. For example, the communication unit 170 may transmit the video file of the second format to a server which transmits a video wirelessly in real-time via an intranet or internet network. Therefore, clients connected to a broadcast server may view the video photographed or recorded by the photographing apparatus 100 in real-time. The communication unit 170 may also be implemented using a wireless local area network (LAN).

The manipulation unit 190 can receive a manipulation from a user, and transmit the manipulation to the control unit 180. Specifically, the manipulation unit 190 may be buttons or a touchscreen provided on the photographing apparatus 100.

The control unit 180 may control overall operations of the photographing apparatus 100. In more detail, the control unit 180 may control the second MUX 150 to perform at least one of storing the video file of the second format in the storage unit 160 and transmitting the video file of the second format wirelessly through the communication unit 170 according to the manipulation of the user or instructions pre-stored in the storage unit 160. The control unit 180 may control the second MUX 150 to output the video file of the second format to the storage unit 160, thereby storing the video file of the second format in the storage unit 160. The controlling unit 180 may also control the second MUX 150 to output the video file of the second format to the communication unit 170 in order to transmit the video file of the second format wirelessly in real-time.

The control unit 180 may also control the scaler 123 to adjust the size of the first video data (V0) by performing at least one of adjusting the resolution of the first video data (V0) and extracting specific portions from the first video data (V0) according to the manipulation of the user, or the capabilities of the communication unit 170.

The control unit 180 may control the selection unit 130 to select one of the first video stream (V2) and the second video stream (V3), and to output the selected video stream (V2) or (V3) to the second MUX 150 according to the manipulation of the user or program stored in the control unit 160 or controller 180. Thus, a user using the internet can view the video captured by the user in real-time.

The photographing apparatus 100 may store the photographed video having high quality in the storage unit 160, as well as transmit the video wirelessly in real-time externally to the photographing apparatus 100. Therefore, a user may transmit and broadcast a photographed or recorded video in real-time via a network while photographing an object using the photographing apparatus 100.

Figure 3:
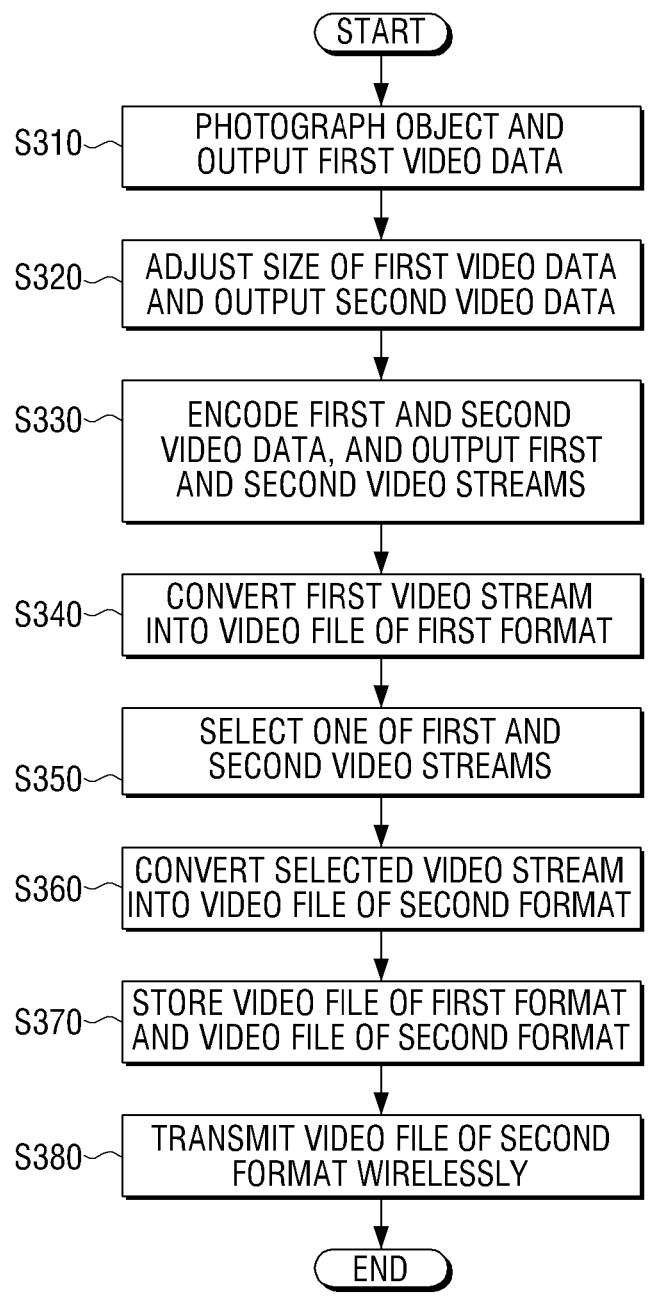
FIG. 3 is a flowchart illustrating a method of providing a photographed video according to an exemplary embodiment of the present general inventive concept.

Hereinbelow, a method of providing a photographed video will be explained in detail with reference to FIG. 3. FIG. 3 is a flowchart illustrating a method of providing a photographed video according to an exemplary embodiment of the present general inventive concept.

The photographing apparatus 100 photographs or records an object through the image sensor 120, and generates and outputs the first video data (V0) in operation S310. That is, the image sensor 120 converts light into the first video data (V0) which may be an electrical signal.

The photographing apparatus 100 may adjust the size of the first video data (V0), and generate and outputs the second video data with adjusted size (V1) in operation S320. The photographing apparatus 100 may perform at least one of adjusting the resolution of the first video data (V0) and extracting at least one specific portion from the first video data (V0) to adjust the size of the first video data (V0).

Specifically, the photographing apparatus 100 may generate the second video data (V1) of which the file size is smaller than that of the first video data (V0) by adjusting the resolution of the first video data (V0) from a high resolution to a lower resolution. For example, the photographing apparatus 100 may adjust the resolution of the first video data (V0) from full high definition (HD) to standard definition (SD), and generate the second video data (V1).

The photographing apparatus 100 may also generate the second video data (V1) of which the file size is smaller than that of the first video data (V0) by extracting at least one portion from the first video data (V0). For example, the photographing apparatus 100 may extract a portion which may be pre-programmed to be extracted or a user selects from the first video data (V0), and generates the second video data (V1) using the extracted portion.

Therefore, the photographing apparatus 100 may adjust the resolution of the first video data (V0) or may extract at least one specific portion from the first video data (V0) according to a pre-programmed selection or a selection of a user to generate or output the second video data (V1) of which the size has been adjusted.

Thus, the photographing apparatus 100 can reduce the size of the first video data (V0) to have a capacity which is the same as or less than the capacity capable of being transmitted wirelessly in real-time by the communication unit 170, and generate the second video data (V1). Since the first video data (V0) which is an original video photographed by the photographing apparatus 100 is a high quality video, there is a possibility that it is difficult or impossible to transmit the first video data (V0) over available bandwidth of the communication unit 170. Therefore, the photographing apparatus 100 may reduce the size of the first video data (V0) which is the original video to generate the second video data (V1), thereby enabling the photographing apparatus 100 to transmit the photographed video over the bandwidth accessible by the communication unit 170.

The photographing apparatus 100 encodes the first video data (V0) and the second video data (V1), and outputs the first video stream (V2) and the second video stream (V3), respectively in operation S330. Specifically, the photographing apparatus 100 encodes the first video data (V0) and the second video data (V1) in parallel.

The photographing apparatus 100 multiplexes the first video stream (V2) and the audio stream (A1), and converts the multiplexed stream into a video file of a first format in operation S340. Herein, the first format represents a format suitable to store a video file. Since the video file of the first format is an original photographed video, the first multiplexer 140 of the photographing apparatus 100 converts the first video stream (V2) into the first format suitable to store a file. For example, the first format may be a format such as MP4, audio video interleave (AVI), and so on. The structure of a file of the MP4 format is illustrated in FIGS. 7A and 7B, and thus this will be explained later.

The photographing apparatus 100 may select one of the first video stream (V2) and the second video stream (V3) according to a program of a manipulation of a user in operation S350. If the bandwidth of the communication unit 170 is enough to transmit the first video stream (V2) wirelessly in real-time, a user may manipulate the photographing apparatus 100 to select the first video stream (V2). Usually, as the first video stream (V2) is a high quality video, it is impossible to transmit the first video stream (V2) wirelessly in real-time. In such a case, the photographing apparatus 100 may select the second video stream (V3) of which the size has been scaled to smaller.

The photographing apparatus 100 may multiplex the audio stream (A1) and the video stream selected from the first and second video streams (V2) and (V3), and convert the multiplexed stream into a video file of a second format in operation S360. Since the video file of the second format will be transmitted wirelessly in real-time, the photographing apparatus 100 may convert the video stream input by the selection unit 130 into the second format which is suitable to transmit a file wirelessly in real-time. The second format is also a file format suitable for a wireless transmission in real-time. The file structure of a file format suitable for wireless transmission in real-time is illustrated in FIGS. 8A to 8C, and thus this will be explained later. As described above, since the video file of the second format is for wireless transmission, the video file may have the capacity which is the same as or less than the capacity capable of being transmitted wirelessly by the communication unit 170 in real-time.

The photographing apparatus 100 stores the video file of the first format and the video file of the second format in operation S370.

The photographing apparatus 100 may transmit a video file of the second format wirelessly through communication network such as an intranet or internet network. For example, the photographing apparatus 100 may transmit the video file of the second format to a server which broadcasts a video in real-time through the communication unit 170. Clients, customers, social-networking sites, business networking applications, etc. connected to the server may view the video recorded or photographed by the photographing apparatus 100 in real-time.

Through the above process, the photographing apparatus 100 may store the photographed video having high quality in the storage unit 160, as well as broadcast the video in real-time external to the photographing apparatus 100 to be used and seen by external users. Therefore, a user may record, transmit and broadcast a photographed video in real-time via over a network while photographing an object using the photographing apparatus 100.

Figure 4:
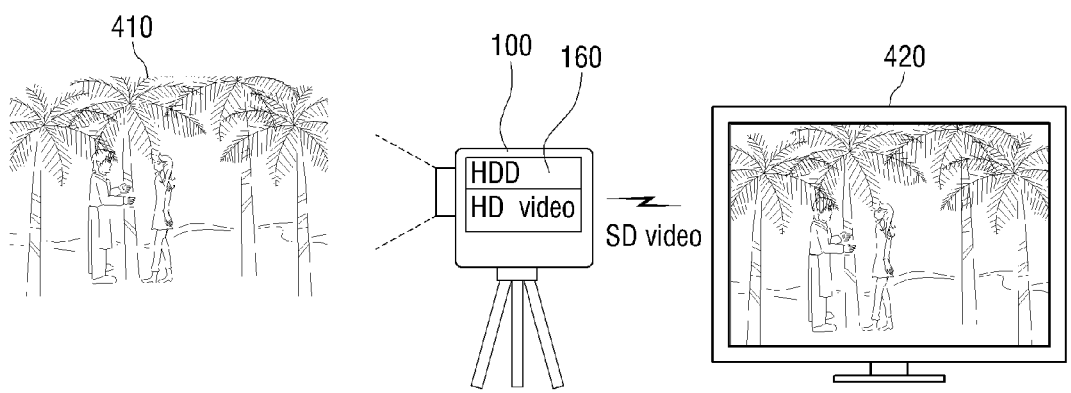
FIG. 4 is a view illustrating a video which is photographed by a photographing apparatus and broadcast in real-time, according to an exemplary embodiment of the present general inventive concept.

FIG. 4 is a view illustrating a video which is photographed by the photographing apparatus 100 and broadcast in real-time, according to an exemplary embodiment of the present general inventive concept.

Referring to FIG. 4, the photographing apparatus 100 may photograph moving images such as live objects or a scene 410, and temporarily store a photographed video of the objects or scene 410 having full HD quality in the storage unit 160 as a full HD quality video. The photographing apparatus 100 may scale the photographed video having full HD quality to have SD quality. The photographing apparatus 100 may wirelessly transmit the scaled video having SD quality to an external device 420 such as a television, computer monitor, handheld device, or other displays as are known in the art. As illustrated in FIG. 4, the video photographed by the photographing apparatus 100 may be displayed on the camera itself or on an external display 420 in SD quality. Also, upon transmission, the video having SD quality may be embedded with a code to allow the SD quality video to be expanded to HD at a receiving end of the transmission.

The photographing apparatus 100 may store an original photographed video having high quality, as well as broadcast the photographed video converted to have low quality suitable for wireless transmission external to the photographing apparatus 100.

Hereinbelow, a method of scaling a high quality video will be explained with reference to FIGS. 5 and 6.

Figure 5:
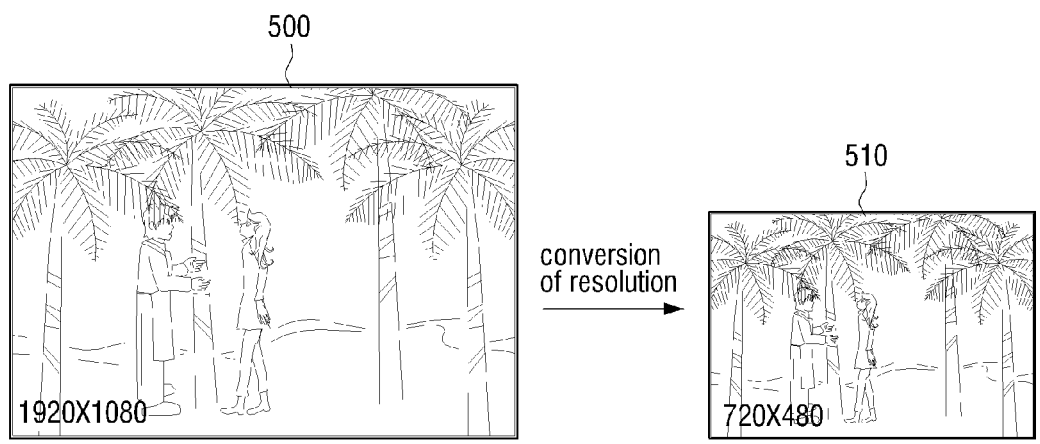
FIG. 5 is a view illustrating an original photographed video and a video having resolution converted by a scaler according to an exemplary embodiment of the present general inventive concept.

FIG. 5 is a view illustrating an original photographed video and a video having resolution converted by the scaler 123 according to an exemplary embodiment of the present general inventive concept. FIG. 5 illustrates that first video data 500 which is an original photographed video having high quality may be scaled to second video data 510 having lower quality through resolution conversion.

As illustrated in FIGS. 1 and 5, the scaler 123 of the photographing apparatus 100 scales the first video data 500 having 1920×1080 resolution to the second video data 510 having 720×480, and generates the second video data 510 of which the size has been reduced.

Figure 6:
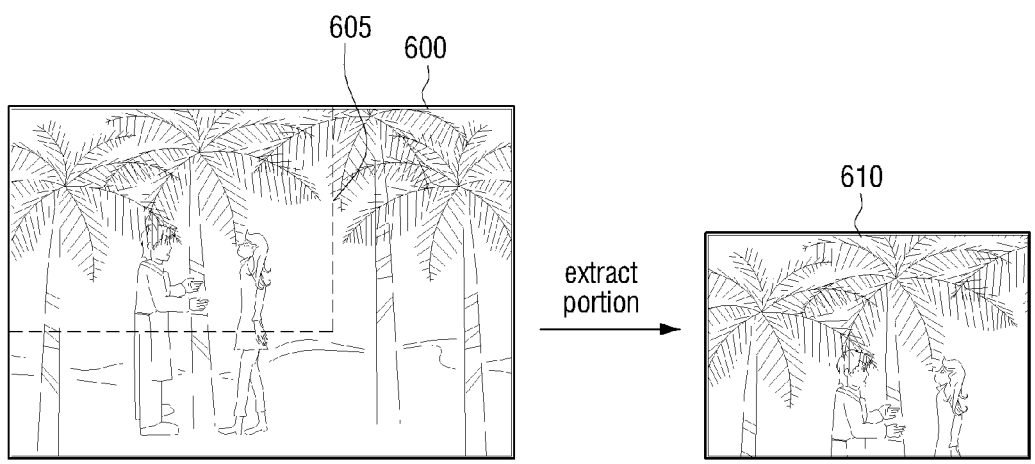
FIG. 6 is a view illustrating an original photographed video and a portion extracted from the original photographed video by a scaler according to an exemplary embodiment of the present general inventive concept.

FIGS. 1 and 6 illustrate an original photographed video and a portion 605 which the scaler 123 may extract from the original photographed video according to an exemplary embodiment of the present general inventive concept. FIG. 6 illustrates that the portion 605 of first video data 600 which is an original photographed video may be extracted, thereby being scaled to second video data 610.

As illustrated in FIGS. 1 and 6, the scaler 123 of the photographing apparatus 100 extracts the portion 605 from the first video data 600 having a specific size, scales the portion 605 to the second video data 610, and generates the second video data 610 of which the size has been reduced. The portion 605 may be selected by the manipulation of a user, or may be a predetermined portion. The extracted portion 610 is not limited to an upper left hand corner portion of the original video 605 illustrated in FIG. 6, but may be any portion or portions programmed into the controller 180 or selected by a user through the manipulation unit 190.

Hereinbelow, the first format and the second format generated by the first MUX 140 and the second MUX 150 will be explained in detail with reference to FIGS. 7A to 8C.

FIGS. 7A and 7B are views illustrating the structure of a video file of MPEG layer 4 (MP4) format that may stored in the storage unit 160 or transmitted by the communication unit 170 according to an exemplary embodiment of the present general inventive concept. FIG. 7A illustrates the structure of the ISO file system 710 of the MP4 format. The Moov box 720 of the ISO file system illustrated in FIG. 7A may include a number of different boxes and hierarchies, and may provide for basic functionality of the MPEG 4 file to be stored or transmitted by the communication unit 170 over the an intranet or internet network, received by external devices, decoded, and displayed on an HD or SD display device. Basic functionality included in the Moov file may include dimensions of a video file, or the duration of audio that is multiplexed with the captured video to create a video file.

As illustrated in FIG. 7A, the Moov box 720 may include a plurality of boxes including a data track box 725 for a video stream and a data track box 727 for audio an audio stream that may be encoded in the video encoder 125 and audio encoder 115 before being multiplexed in the second multiplexer unit 150 as illustrated in FIG. 1. The ISO file illustrated in FIG. 7A may also include an "mdat" box 730 where the actual raw information for the ISO file may be stored while being transmitted over a network or stored in the photographing apparatus 100. The boxes, also known as atoms, illustrated in FIG. 7A represent quantities of data that may make up an MPEG 4 file to be stored or transmitted.

An MPEG 4 video file may include a number of audio and video streams as described above. Each stream may be stored in a separate track in a file. A track in a file may represent a timed series of media, such as successive video frames. Various tracks may include the atoms, or boxes, as illustrated in FIG. 7B.

FIG. 7B illustrates the structure of a Moov box 740 or atom in the ISO file of the MP4 format. The video file of the MP4 format having such file system may be a video file format suitable to store a file. The structure of the movie header Moov may include a movie header "mvhd" which may give basic information about the content of the video file to be stored or transmitted wirelessly, such as date of formation and duration. The track header "trak" stores metadata for each track, that may be used later by a user. The file may include additional boxes such as "tkhd", another track header with track reference box "tref", a media box "mdia" to include media declarations. The mdia box may include another media header "mdhd," a handler box "hdlr" and media information "minf." The file to be stored or transmitted may further break down in either the audio or video track of the Moov box to include a video media header "vmhd," data information "dinf" with a data reference "dref", and a sample table "stbl" that includes sample timing, location information, and structural data. The sample table box "stbl" is broken down further into a sample table sample description "stsd" box, a sample table time to sample "stts" box, a sample table sample to chunk "stsc" box, and a sample table chunk offset "stco" box."

The files including the audio and video combined streams may be transmitted over the intranet and internet using internet protocols such as Real-time Transport Protocol (RTP) controlled by the controller 180.

FIGS. 8A to 8C are views illustrating the structure of a video file to be broadcast in real-time according to an exemplary embodiment of the present general inventive concept.

FIG. 8A illustrates the operation of a video encoder 125, an audio encoder 115, a file format MUX (that is, the second MUX 150), and communication unit 170 when real-time broadcasting starts according to an exemplary embodiment of the present general inventive concept. As illustrated in FIG. 8A, when real-time broadcasting starts, video information data and audio information data are output first from being encoded in the video encoder unit 125 and audio encoder unit 825 to the multiplexer 150. Input data transfer takes place between the encoders and the multiplexer 150. The multiplexer 150 combines the audio and video streams output from the encoders 125 and 115 into a video file that includes an output data transfer to the communication unit 170. The multiplexer 150 may convert the audio streams into a video file including audio and video track information, such as the video track 725 and audio track 727 of the Moov box 720 illustrated in FIG. 7A. Necessary data and timing information is recorded in the headers and other boxes of audio and video tracks illustrated in FIG. 7B to be transmitted from the multiplexer 150 to the communication unit 170 to transmit the audio and video files wirelessly external to the photographing apparatus 100.

FIG. 8B illustrates the data structure of a file system suitable for wireless transmission in real-time, and FIG. 8C illustrates the structure of Message_T illustrated in FIG. 8B.

The video file of the second format may be implemented in the structures of FIGS. 8B and 8C. The video file of the second format may be applied to any format which allows a file to be wirelessly transmitted in real-time.

In this exemplary embodiment of the present general inventive concept, the photographing apparatus may be any device which photographs motion pictures, and may be a camcorder, a video camera, digital camera, cellular telephone, MP3 player, and so on, which may record moving images.

According to various exemplary embodiments of the present general inventive concept, the photographing apparatus to convert the photographed video into two types of formats, to store the video, and to transmit the video wirelessly in real-time, and the method of providing a photographed video thereof are provided. Therefore, a user can store high quality video photographed or recorded using the photographing apparatus, as well as broadcasting the photographed video in real-time.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A photographing apparatus, comprising:
   an image sensor to photograph an object and to output first video data;
   a scaler to adjust the size of the first video data, and to output second video data having a reduced file size than the first video data;

a video encoder to encode the first video data and the second video data, and to output a first video stream and a second video stream;

a first multiplexer (MUX) to multiplex the first video stream and an audio stream, and to convert the multiplexed stream into a video file of a first format;

a second multiplexer (MUX) to multiplex one of the first video stream and the second video stream and the audio stream, and to convert the multiplexed stream into a video file of a second format; and a communication unit to transmit the video file of the second format wirelessly.

2. The photographing apparatus of claim 1, further comprising:

a selection unit to select one of the first video stream and the second video stream according to a manipulation of a user, and to output the selected video stream.

3. The photographing apparatus of claim 1, further comprising:

a storage unit to store at least one of the video file of the first format and the video file of the second format.

4. The photographing apparatus of claim 3, wherein:

the first MUX outputs the video file of the first format to the storage unit;

the second MUX multiplexes the second video stream with the audio stream, converts the multiplexed stream into a video file of the second format, and outputs the video file of the second format to the communication unit; and the communication unit transmits the video file of the second format wirelessly external to the photographing apparatus.

5. The photographing apparatus of claim 4, wherein the video file of the first format is a video file having the same definition as the first video data photographed by the image sensor.

6. The photographing apparatus of claim 5, wherein the video file of the first format is a video file having full high definition (HD).

7. The photographing apparatus of claim 4, wherein the video file of the second format is a video file having capacity which is the same as or less than the capacity capable of being transmitted by the communication unit wirelessly.

8. The photographing apparatus of claim 3, further comprising:

a control unit to control the second MUX to perform at least one of storing the video file of the second format in the storage unit and transmitting the video file of the second format wirelessly through the communication unit according to a manipulation of a user.

9. The photographing apparatus of claim 1, wherein the scaler adjusts the size of the first video data by performing at least one of adjusting resolution of the first video data and extracting a specific portion from the first video data.

10. A method of providing a photographed video, comprising:

photographing an object and generating first video data;

adjusting a file size of the first video data, and generating second video data having a reduced file size than the first video data;

encoding the first video data and the second video data to be converted into a first video stream and a second video stream;

multiplexing the first video stream and an audio stream, and converting the multiplexed stream into a video file of a first format;

multiplexing a selected one of the first video stream and the second video stream and the audio stream, and converting the multiplexed stream into a video file of a second format; and transmitting the video file of the second format wirelessly.

11. The method of claim 10, wherein the converting the multiplexed stream into a video file of a second format selects one of the first video stream and the second video stream according to a manipulation of a user, multiplexes the selected video stream and the audio stream, and converts the multiplexed stream into a video file of a second format.

12. The method of claim 10, further comprising:

storing at least one of the video file of the first format and the video file of the second format.

13. The method of claim 12, wherein:

the storing stores the video file of the first format;

the converting the multiplexed stream into the video file of the second format multiplexes the second video stream with the audio stream, and converts the multiplexed stream into a video file of the second format; and the transmitting transmits the video file of the second format wirelessly external to the photographing apparatus.

14. The method of claim 13, wherein the video file of the first format is a video file having the same definition as that of the first video data photographed by an image sensor.

15. The method of claim 14, wherein the video file of the first format is a video file having full high definition (HD).

16. The method of claim 13, wherein the video file of the second format is a video file having capacity which is the same as or less than the capacity capable of being transmitted by the communication unit wirelessly.

17. The method of claim 12, further comprising:

controlling to perform at least one of storing the video file of the second format and transmitting the video file of the second format wirelessly according to a manipulation of a user.

18. The method of claim 10, wherein the generating the second video data adjusts the file size of the first video data by performing at least one of adjusting resolution of the first video data and extracting a specific portion from the first video data, and generates the second video data.

19. A photographing apparatus comprising:

an image sensor unit to capture moving images, convert the moving images into an electrical signal and output the electrical signal as video data;

a scaler unit to reduce the size of the video data;

a multiplexer unit to generate a first video file of a first format and a second video file of a second format that is different than the first format, the first video file being based on the video data and the second video file being based on a selected one of the video data and the reduced size video data; and a communication unit to wirelessly transmit the second video file in real time.

20. The photographing apparatus of claim 19, further comprising:

a video encoder unit to receive the video data and the reduced size video data and create a plurality of video streams to correspond to the video data and reduced file size video data.

21. The photographing apparatus of claim 20, further comprising:

a selection unit to select one of the plurality of video streams to be converted by the multiplexer unit; and a control unit to control the output of the selection unit according to a pre-programmed option or a manipulation of a user.

22. The photographing apparatus of claim 20, wherein at least one of the first and second video filea comprises a moov box and an mdat box.

23. The photographing apparatus of claim 20, wherein the video encoder unit further comprises:
   an encoder;
   a first buffer to temporarily store the video data output from the image sensor; and
   a second buffer to temporarily store the reduced file size video data output from the scaler unit,
   wherein the first and second buffers alternately input the video data and reduced file size video data to the encoder.

24. A method of providing a photographed video, the method comprising:
   converting moving images into an electrical signal and outputting the electrical signal as video data;
   reducing a file size of the video data;
   generating a first video file of a first format, the first video file being based on the video data;
   generating a second video file of a second format that is different than the first format, the second video file being based on a selected one of the video data and the reduced file size video data; and
   wirelessly transmitting the second video file in real time.

25. The method of claim 24, further comprising:
   receiving the reduced file size video data in an encoder unit and encoding the reduced size video data into a video stream.

26. The method of claim 25, further comprising:
   temporarily storing the video data in a first buffer of the encoder unit; and
   temporarily storing the reduced file size video data in a second buffer of the encoder unit,
   wherein the first and second buffers alternately input the video data and reduced file size video data to an encoder within the encoder unit.

27. The method of claim 25, wherein at least one of the first and second video file files includes a track having data and timing information to correspond to different portions of the video file.

28. A method of providing a photographed video, the method comprising:
   converting a photographed video into a first video data having first type of video data format and a second video data having a second type of video data format that is different than the first type of video data format, the second video data having a smaller file size than the first video data;
   temporarily storing the converted first and second video data;
   generating a first video file of a first format, the first video file being based on the first video data;
   generating a second video file of a second format, the second video file being based on a selected one of the first and second video data; and
   transmitting the second video file wirelessly in real time.

29. The method of claim 28, wherein the transmitted video file corresponds to the second video data.

30. The method of claim 29, wherein the file size of the second video data is reduced by reducing the resolution of the first video data or selecting a portion of the first video data.

31. The method of claim 30, further comprising:
   receiving the first video data and second video data in an encoder and parallel encoding the first video data and the second video data into a plurality of video streams.

* * * * *

UNITED STATES PATENT AND TRADEMARK OFFICE
CERTIFICATE OF CORRECTION

| | |
|---|---|
| PATENT NO. | : 9,049,362 B2 |
| APPLICATION NO. | : 12/909904 |
| DATED | : June 2, 2015 |
| INVENTOR(S) | : Jin-su Myung |

It is certified that error appears in the above-identified patent and that said Letters Patent is hereby corrected as shown below:

In the claims

Claim 1, Column 12, Line 65

Delete "the" and insert --a file--, therefor.

Claim 1, Column 13, Line 7 (Approximately)

After "multiplex" insert --a selected--.

Claim 9, Column 13, Line 53

After "adjust the" insert --file--.

Claim 19, Column 14, Line 46

Delete "the" and insert --a file--, therefor.

Claim 20, Column 14, Line 58

After "reduced" insert --file--.

Claim 22, Column 15, Line 2

Delete "filea" and insert --files--, therefor.

Signed and Sealed this
Twenty-seventh Day of October, 2015

Michelle K. Lee
*Director of the United States Patent and Trademark Office*

CERTIFICATE OF CORRECTION (continued)
U.S. Pat. No. 9,049,362 B2

Claim 27, Column 16, Line 5

Delete "video file" and insert --video--, therefor.

Claim 28, Column 16, Line 11

After "having" insert --a--.